United States Patent
Wollmann et al.

(10) Patent No.: US 9,211,607 B2
(45) Date of Patent: Dec. 15, 2015

(54) DEVICE FOR SIMULTANEOUSLY PROCESSING THE CIRCUMFERENCE OF A WORKPIECE WITH LASER BEAMS

(75) Inventors: Werner Wollmann, Jena (DE); Jan Langebach, Gera (DE); Andreas Zintl, Wandersleben (DE); Martin Griebel, Jena (DE)

(73) Assignee: JENOPTIK AUTOMATISIERUNGSTECHNIK GMBH, Jena (DE)

( * ) Notice: Subject to any disclaimer, the term of this patent is extended or adjusted under 35 U.S.C. 154(b) by 927 days.

(21) Appl. No.: 13/253,149

(22) Filed: Oct. 5, 2011

(65) Prior Publication Data

US 2012/0085740 A1    Apr. 12, 2012

(30) Foreign Application Priority Data

Oct. 8, 2010  (DE) .......................... 10 2010 047 917

(51) Int. Cl.
*B23K 26/06* (2014.01)
*B23K 26/28* (2014.01)

(52) U.S. Cl.
CPC ......... *B23K 26/0604* (2013.01); *B23K 26/0621* (2013.01); *B23K 26/28* (2013.01)

(58) Field of Classification Search
CPC ........... B23K 26/0621; B23K 26/0604; B23K 26/0823; B23K 26/0884; B23K 26/16; B23K 26/38; B23K 26/0613; H02G 1/128; G02B 6/10
USPC ............. 219/121.75, 121.61, 121.62, 121.67, 219/121.68, 121.69, 121.72, 121.76, 219/121.78, 121.81, 121.82; 264/400; 372/50.1–50.23
See application file for complete search history.

(56) References Cited

U.S. PATENT DOCUMENTS

| | | | | |
|---|---|---|---|---|
| 3,957,339 A * | 5/1976 | Engel | ......................... | 359/198.1 |
| 4,012,213 A * | 3/1977 | Haggerty et al. | ............... | 65/485 |
| 4,135,077 A * | 1/1979 | Wills | ......................... | 219/121.6 |
| 4,197,157 A * | 4/1980 | Haggerty | ......................... | 117/18 |
| 4,223,202 A * | 9/1980 | Peters et al. | ............... | 219/121.6 |
| 4,224,096 A * | 9/1980 | Osborne | .................... | 156/380.9 |
| 4,812,639 A * | 3/1989 | Byren et al. | ............... | 250/201.1 |
| 5,430,816 A * | 7/1995 | Furuya et al. | .................. | 385/33 |

(Continued)

FOREIGN PATENT DOCUMENTS

| | | |
|---|---|---|
| DE | 10020327 A1 * | 11/2001 |
| DE | 10020327 A1 | 4/2008 |

(Continued)

*Primary Examiner* — Geoffrey S Evans
(74) *Attorney, Agent, or Firm* — Leydig, Voit & Mayer, Ltd.

(57) ABSTRACT

A device for simultaneously processing a circumference of a workpiece includes a plurality of laser-lens modules and a waveguide. The modules each include a diode laser and a lens system and is configured to emit a laser beam radially in a shared radiation plane. The waveguide includes a lower part and an upper part that together form a cavity enclosing the radiation plane. The laser-lens modules are configured so that the laser is reflected repeatedly between a bottom surface and a cover surface and propagates in an unaffected manner within the radiation plane so as to form a beam spot that strikes the workpiece with a homogeneous energy distribution. The beam spot has a height based on a distance between the surfaces and a width based on a divergence angle in the radiation plane and a distance of the module from the workpiece surface.

11 Claims, 3 Drawing Sheets

(56) References Cited

U.S. PATENT DOCUMENTS

| | | | |
|---|---|---|---|
| 5,444,213 A * | 8/1995 | Honda et al. | 219/121.76 |
| 5,455,389 A * | 10/1995 | Hirose et al. | 174/126.1 |
| 5,514,867 A * | 5/1996 | Beyer et al. | 250/227.11 |
| 5,558,788 A * | 9/1996 | Mashburn | 219/121.68 |
| 5,601,735 A * | 2/1997 | Kawamoto et al. | 219/121.63 |
| 5,766,957 A * | 6/1998 | Robinson et al. | 436/165 |
| 6,130,405 A * | 10/2000 | Loringer | 219/121.71 |
| 6,403,916 B1 * | 6/2002 | Spooner et al. | 219/121.63 |
| 6,476,345 B1 | 11/2002 | Sator | |
| 6,608,277 B2 * | 8/2003 | Spooner et al. | 219/121.63 |
| 6,653,592 B2 * | 11/2003 | Andersen | 219/121.68 |
| 6,734,389 B2 * | 5/2004 | Troitski | 219/121.69 |
| 6,982,996 B1 * | 1/2006 | Putnam et al. | 372/6 |
| 7,082,250 B2 * | 7/2006 | Jones et al. | 385/134 |
| 7,368,681 B2 | 5/2008 | Mikhailov | |
| 2002/0100748 A1 * | 8/2002 | Andersen | 219/121.68 |
| 2002/0162828 A1 * | 11/2002 | Spooner et al. | 219/121.63 |
| 2003/0102289 A1 * | 6/2003 | Nissels et al. | 219/121.68 |
| 2004/0105644 A1 * | 6/2004 | Dawes | 385/129 |
| 2004/0159637 A1 * | 8/2004 | Herke et al. | 219/121.18 |
| 2004/0219286 A1 * | 11/2004 | Flanagan | 427/2.1 |
| 2005/0161446 A1 * | 7/2005 | Fuson | 219/121.82 |
| 2006/0256827 A1 * | 11/2006 | Volodin et al. | 372/50.121 |
| 2007/0007259 A1 * | 1/2007 | Mikhailov | 219/121.63 |
| 2007/0158318 A1 * | 7/2007 | Yamazaki et al. | 219/121.76 |
| 2008/0283510 A1 * | 11/2008 | Chagnot | 219/121.83 |
| 2010/0100171 A1 * | 4/2010 | Atladottir et al. | 623/1.42 |

FOREIGN PATENT DOCUMENTS

| | | |
|---|---|---|
| DE | 102007001639 A1 * | 4/2008 |
| EP | 1144170 B1 | 6/2002 |

* cited by examiner

DEVICE FOR SIMULTANEOUSLY PROCESSING THE CIRCUMFERENCE OF A WORKPIECE WITH LASER BEAMS

CROSS REFERENCE TO RELATED APPLICATIONS

This application claims priority to German Patent Application No. DE 10 2010 047 917.9, filed Oct. 8, 2010, which is hereby incorporated by reference herein in its entirety.

FIELD

The invention relates to a device for processing the circumference of a workpiece with laser beams, in particular workpieces that have a prismatic or cylindrical circumferential surface lend themselves for having the circumference processed by means of a device according to the invention.

BACKGROUND

Here, the term workpiece refers to a single component or to an assembly consisting of two interlocked components.

The circumferential processing can be, for example, the welding of two plastic components, the shrinking of a film tube onto a glass fiber, or the curing of a coating on a component.

Devices of this generic type can be found in the state of the art especially in conjunction with welding processes. A distinction is made here between contour welding and simultaneous welding.

In contour welding, one or more laser beams and a workpiece that is to be welded are moved relative to each other so that the laser beam or beams pass over the workpiece circumferential surface along a desired weld seam.

In simultaneous welding, the entire weld seam is exposed to one or more laser beams at the same time.

U.S. Pat. No. 7,368,681 B2 describes such a device. It comprises a plurality of laser beam sources which are arranged at equal distances from each other on a circle and which each emit a laser beam radially with respect to the mid-point of the circle where the laser beams are superimposed and are supposed to form a processing area having a constant energy density. A beam-forming lens system, which influences the divergence of the laser beams, is arranged in front of the laser sources, which can be diode lasers (laser diodes or laser diode bars), as seen in the radiation direction.

In this process, via the divergence in the plane of the circle, in conjunction with the radius of the circle, the size of the processing area having a constant energy density can be adapted to the size of the workpiece that is placed into this processing area in order to be processed. The beam expansion perpendicular to the plane of the circle is the determining factor for the width of the weld seam.

Since the energy distribution in a laser beam fundamentally corresponds to a Gaussian distribution, the homogeneity of the energy distribution improves with the increasing number of superimposed laser beams that are offset with respect to each other.

A drawback is that an approximately constant energy density in the plane of the circle, which is the determining factor for the quality of the weld seam along its length, is only achieved with a very large number of laser beam sources.

The energy distribution perpendicular to the plane, which is the determining factor for the quality of the weld seam along its width, still remains a Gaussian distribution.

Moreover, such a device calls for additional measures that ensure the laser safety, i.e. ensuring that neither people nor machines are exposed to the risk of injury or damage by the laser beams while the device is operational.

SUMMARY

In an embodiment, the present invention provides a device for simultaneously processing a circumference of a workpiece with laser beams including a plurality of laser-lens modules and a waveguide. Each laser-lens module includes a diode laser and a beam-forming lens system disposed in front of the diode laser. The laser-lens modules are disposed at equal distances from each other on a circle. The laser-lens modules are each configured to emit a laser beam radially in a shared radiation plane with respect to a mid-point of the circle such that axes of the laser beams intersect in the mid-point. The waveguide has a straight cylinder shape with a cylinder axis, and is disposed within the circle with the cylinder axis being perpendicular to the radiation plane and extending through the mid-point of the circle and a recess being formed around the cylinder axis. The recess is configured to hold a workpiece during the processing. The waveguide includes a lower part and an upper part that together form a cavity enclosing the radiation plane. The cavity is open due to the recess and has a bottom surface configured to reflect the laser beams and a cover surface configured to reflect the laser beams. The cavity has a beam inlet opening toward each of the plurality of laser-lens modules along the circumference of the waveguide. The laser-lens modules are each configured to emit the laser beam so as to be reflected repeatedly between the bottom surface and the cover surface of the waveguide and to propagate in an unaffected manner within the radiation plane so as to form a beam spot that strikes the workpiece with a homogeneous energy distribution. The beam spot has a height in a direction of the cylinder axis based on a distance between the bottom surface and the cover surface and a width based on a divergence angle of the laser beam in the radiation plane and a distance of the laser-lens module from a surface of the workpiece.

BRIEF DESCRIPTION OF THE DRAWINGS

Exemplary embodiments of the present invention are described in more detail below with reference to the drawings, in which.

Figure 1:
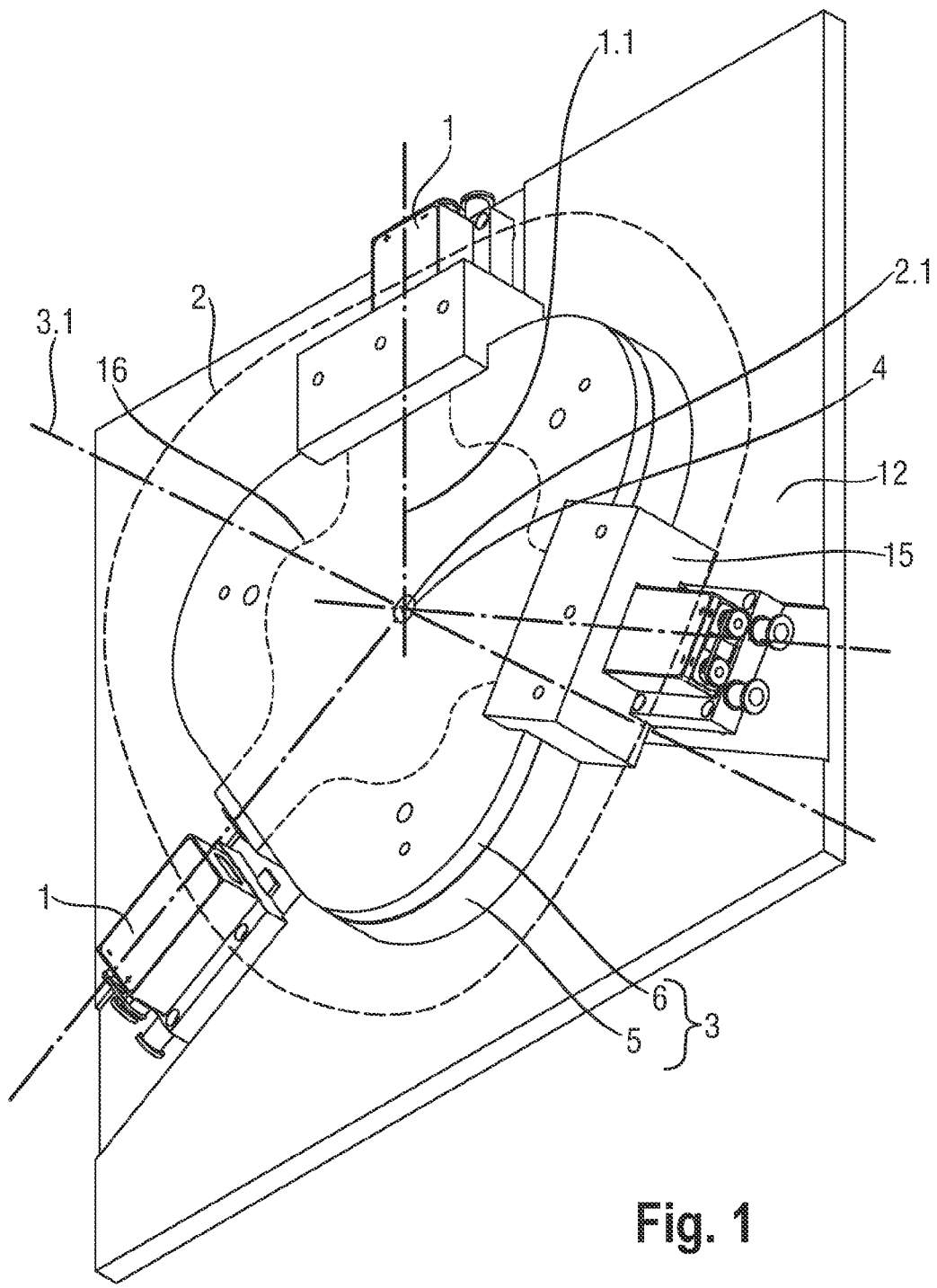
FIG. 1 shows an embodiment of a device in accordance with the present invention.

In an embodiment, the present invention provides a laser-proof device with which the circumferential surface of a workpiece that is placed into the device is exposed in a processing area to laser beams having a homogeneous energy distribution.

In an embodiment, this is achieved by a device for simultaneously processing the circumference of a workpiece with laser beams using a plurality of laser-lens modules, consisting of a diode laser and a beam-forming lens system arranged in front of it, which are arranged at equal distances from each other on a circle and which each emit a laser beam in a shared radiation plane radially with respect to the mid-point of the circle, so that the laser beam axes of the laser beams intersect in the mid-point, this being achieved in that a specially configured waveguide is arranged within the circle.

The waveguide has the shape of a straight cylinder and is arranged in such a manner that its cylinder axis, standing perpendicular on the radiation plane, runs through the mid-point of the circle.

A recess to hold a workpiece that is to be processed is configured around the cylinder axis. This recess can be configured in such a way that its shape and size are adapted to the workpiece that is to be held, so that the workpiece can be placed directly into the recess, or else the recess is configured to be so large that various adapters can be inserted into it that, their with varying cylindrical inner surfaces, enclose a free inner area that is adapted to different workpieces, so that workpieces with different circumferential surfaces can be inserted indirectly into the recess via the adapter.

The waveguide consists of a lower part and an upper part. Both of them together enclose a cavity that encloses the radiation plane. This cavity is opened in the middle by the recess, so that a workpiece placed into the recess can be arranged at least partially in the cavity. The lower part of the waveguide forms the bottom surface of the cavity, while its upper part forms the cover surface. These two surfaces are reflective for the laser beams. On the circumference of the waveguide, the cavity has the same number of beam inlet openings as the number of laser-lens modules. They are each opposite from a laser-lens module and they are so large that they do not restrict an entering laser beam.

A laser beam that is entering through a beam inlet window is reflected back and forth several times between the bottom surface and the cover surface, as a result of which the energy distribution is homogenized over the cross section of the beam. In contrast, the laser beam remains unaffected within the radiation plane.

Consequently, for each laser-lens module, a beam spot having a homogeneous energy distribution strikes the workpiece, and the height of the beam spot in the direction of the cylinder axis is determined by the distance between the bottom surface and the cover surface, while its width is determined by the divergence angle of the laser beam in the radiation plane and the distance of the laser-lens module from the surface of the workpiece.

The recess can penetrate only through the upper part, as a result of which an inserted placed workpiece rests on the lower part, and a circumferential area of the workpiece, which is adjacent to one end of the workpiece, is exposed to the laser beams, for example, in order to form a weld seam.

The recess can also extend partially into the lower part, as a result of which a circumferential area of the workpiece is exposed to laser beams, starting at a distance from one end of the workpiece that is equal to the depth of the recess as it extends into the lower part.

The recess can also completely penetrate the lower part so that the workpiece can be moved in the direction of the cylinder axis by the device. This can be necessary if, for example, a workpiece is to be exposed to laser beams over its entire circumferential surface, for example, in order to harden its surface, or if the workpiece is a continuous piece such as an optical fiber onto which, for instance, a plastic sheathing is to be shrunk.

Advantageously, a sleeve that is transparent for the laser beams can be inserted into the adapter so as to delimit the free inner area, thereby preventing the cavity from becoming dirty. The cavity is then mechanically sealed by the sleeve, but in optical terms, it is open for laser beams to pass through.

The distance between the bottom surface and the cover surface can either be constant over the entire cavity, or advantageously, it can diminish from the circumference of the waveguide towards the recess, as a result of which the quality of the beam spot can be improved due to an increasing number of different reflections.

Advantageously, the larger the circumference of a workpiece to be processed, the larger the number of laser-lens modules. An odd number is advantageous, which means that the laser-lens modules can be situated opposite from each other so as not to be mirror-symmetrical, thus avoiding a direct reciprocal irradiation of the laser-lens modules and an associated destruction of the diode lasers.

In order to be able to process workpieces of differing circumferences using the same number of identical laser-lens modules that each emit a laser beam having a prescribed divergence, especially within the radiation plane, the beam spots generated by these laser-lens modules in the radiation plane can be variable. In order to achieve this, the laser-lens modules are arranged at a different distance from the cylinder axis and thus at different distances from the workpiece. For this purpose, lengthening modules can be arranged between the laser-lens modules and the beam inlet openings.

These lengthening modules are configured in such a way that they each lengthen the cavity in the direction of the laser beam axes. Advantageously, a desired distance is set by means of the number of identical lengthening modules, and the beam spot width on the workpiece is optimally adjusted to the size of the workpiece.

The base area of the waveguide can be a circle, but is advantageously an equilateral polygon with the same number of sides as there are laser-lens modules arranged around the waveguide. The term polygon is used here in the broadest sense to also include a surface with sides of equal length in which the corners, which are formed by side edges meeting each other, are rounded. Since the corners themselves have no function but rather only the side edges are attached onto the laser-lens modules or onto the lengthening modules, these corners can have an angular or rounded configuration.

Advantageously, the waveguide, the lengthening modules and the laser-lens modules can be mounted on a shared baseplate which serves as the reference base for possible manufacturing and mounting tolerances of the individual components.

For purposes of allowing a rapid adaptation of the device in order to process different workpieces, it is advantageous if numerous threaded holes are already provided in the baseplate so that they can be used to selectively mount a variable number of lengthening modules.

It is also advantageous if an infrared sensor is provided in the cavity of the waveguide in order to measure the temperature in the recess.

The temperature measurement can serve exclusively for monitoring the process or else for regulating the process parameters such as the power or the on-time of the diode lasers.

FIG. 1 shows a first embodiment of a device according to the invention. It comprises a flat, stiff baseplate 12 on which three laser-lens modules 1 are arranged on a circle 2 around a waveguide 3 at an equal distance from each other and oriented towards the mid-point 2.1 of the circle 2, so that the laser beam axes 1.1 of the laser beams being emitted by the laser-lens modules 1 lie in a shared radiation plane and intersect at the mid-point 2.1. The waveguide 3, whose mid-point coincides with the mid-point 2.1 of the circle, has a recess 4 in the middle into which a workpiece to be processed can be placed so that its circumferential surface can be exposed to the laser beams.

In order to process workpieces having an increasingly large circumference, instead of three laser-lens modules 1, an increasing number of laser-lens modules 1 can be arranged in the same manner.

The laser-lens modules 1 each consist of a conventional diode laser and a beam-forming lens system.

The diode laser comprises a laser diode, or preferably a laser diode bar, as well as a collimation lens that collimates a laser beam that is emitted by the diode laser and that diverges strongly in the direction of the so-called fast axis, and that leaves said laser beam unaffected in the direction of the so-called slow axis perpendicular thereto in which it diverges only slightly. The diode lasers are arranged within laser-lens modules 1 in such a way that, in the case of a laser module mounted on the baseplate 12, the laser beam is emitted in such a way that its slow axis lies in the propagation plane.

The beam-forming lens system, which is advantageously a plano-convex cylindrical lens, is configured in such a way that it widens the laser beam in the direction of the fast axis to such an extent that it already strikes the bottom surface 5.1 and the cover surface 6.1 shortly after entering the waveguide 3.

In order for the device to function properly, it is important for a laser beam that is aimed at a workpiece positioned in the middle of the device to remain unaffected in the direction of the slow axis and to strike the surface of the workpiece in the direction of the fast axis only after numerous reflections.

Due to the numerous reflections in the direction of the fast axis, the energy distribution in the beam spot striking the surface of the workpiece is homogenized, as a result of which a uniform heat input into the workpiece via the beam spot is achieved.

The expansion of the beam spot in the direction of the fast axis is referred to below as the beam spot height and in the direction of the slow axis as the beam spot width.

By lining up several beam spots, which is done by selecting the number of diode lasers, a circumferential area is exposed to laser beams over a height that is equal to the height of the beam spot simultaneously over the entire circumference of the workpiece. The height of the beam spot is determined by the dimensions of the device, especially the height of the cavity 7 inside the waveguide 3, which will be described below.

The waveguide 3 has the shape of a straight cylinder, consisting of a lower part 5 and an upper part 6, between which a cavity 7 is formed through which the laser beams reach the workpiece. In the direction of the fast axis, the laser beams are reflected back and forth between the cover surface 6.1 of the cavity 7, which is formed by the upper part 6, and the bottom surface 5.1 of the cavity 7, which is formed by the lower part 5. In order to keep the energy losses as low as possible, the bottom surface 5.1 and the cover surface 6.1 as well as the side surfaces 16 that partially connect the cover surface 6.1 and the bottom surface 5.1 are highly reflective. In FIG. 1, the layout of the side surfaces 16 is shown with broken lines by way of example. The layout of the side surfaces 16 is selected in such a way that they do not affect the laser beams, at least on their direct way to the workpiece, that is to say, they do not restrict the laser beams. At the same time, they ensure that the laser beams that have entered the waveguide 3 do not leave it again. Parts of the laser beams that strike the side surfaces 16 as they pass the workpiece are reflected back to the workpiece or to another side surface 16. The side surfaces 16 each end at beam inlet openings 8 on the circumferential surface of the waveguide 3. A beam inlet opening 8 can be seen in the sectional view in FIG. 2.

Figure 2:
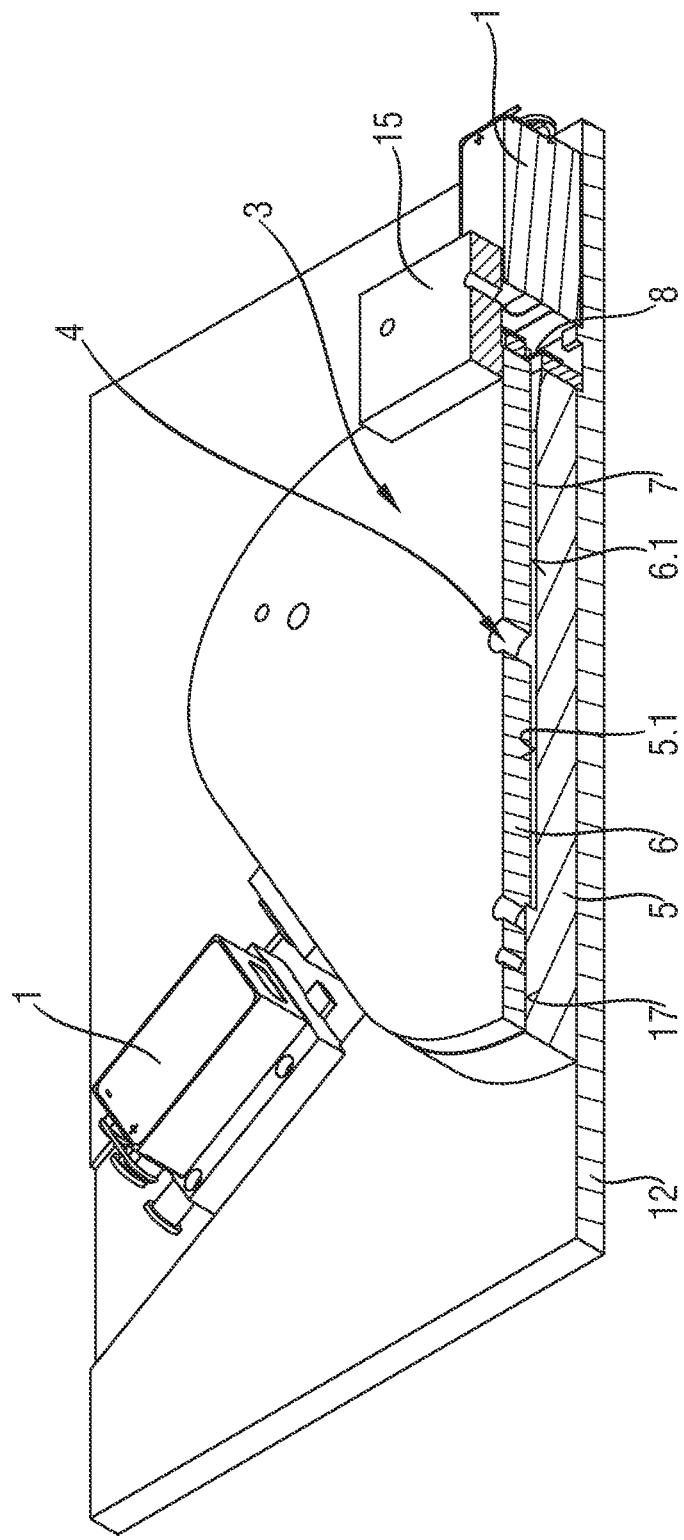
FIG. 2 shows a sectional view through the device of FIG. 1.

In a device according to the first embodiment as shown in FIGS. 1 and 2, the base area of the waveguide 3 is a triangle with markedly rounded corners which together enclose planar surfaces, opposite from each of which a laser-lens module 1 is arranged. According to FIG. 1, the laser-lens modules 1 are each joined to the waveguide 3 via a cover cap 15, which is shown here for two of the laser-lens modules 1. The cover cap 15 has not been depicted on the third laser-lens module 1 in order to show that there can be a gap between the circumferential surface of the waveguide 3 on which a beam inlet opening 8 is provided and a beam exit window of the laser-lens module 1.

As already explained, a laser beam should remain unaffected in the direction of the slow axis. In order to form beam spots having a given beam spot width as a function of the size of the circumference of the workpiece and as a function of the number of laser-lens modules 1, wherein the line-up of said beam spots results in a complete exposure to laser beams around the entire circumference, they are preferably arranged at a certain distance from the circumference of the workpiece at a predefined divergence in the direction of the slow axis.

A possible minimum distance is defined by the dimensioning of the waveguide 3 along whose circumferential surfaces the laser-lens modules 1 can be directly attached.

Figure 3:
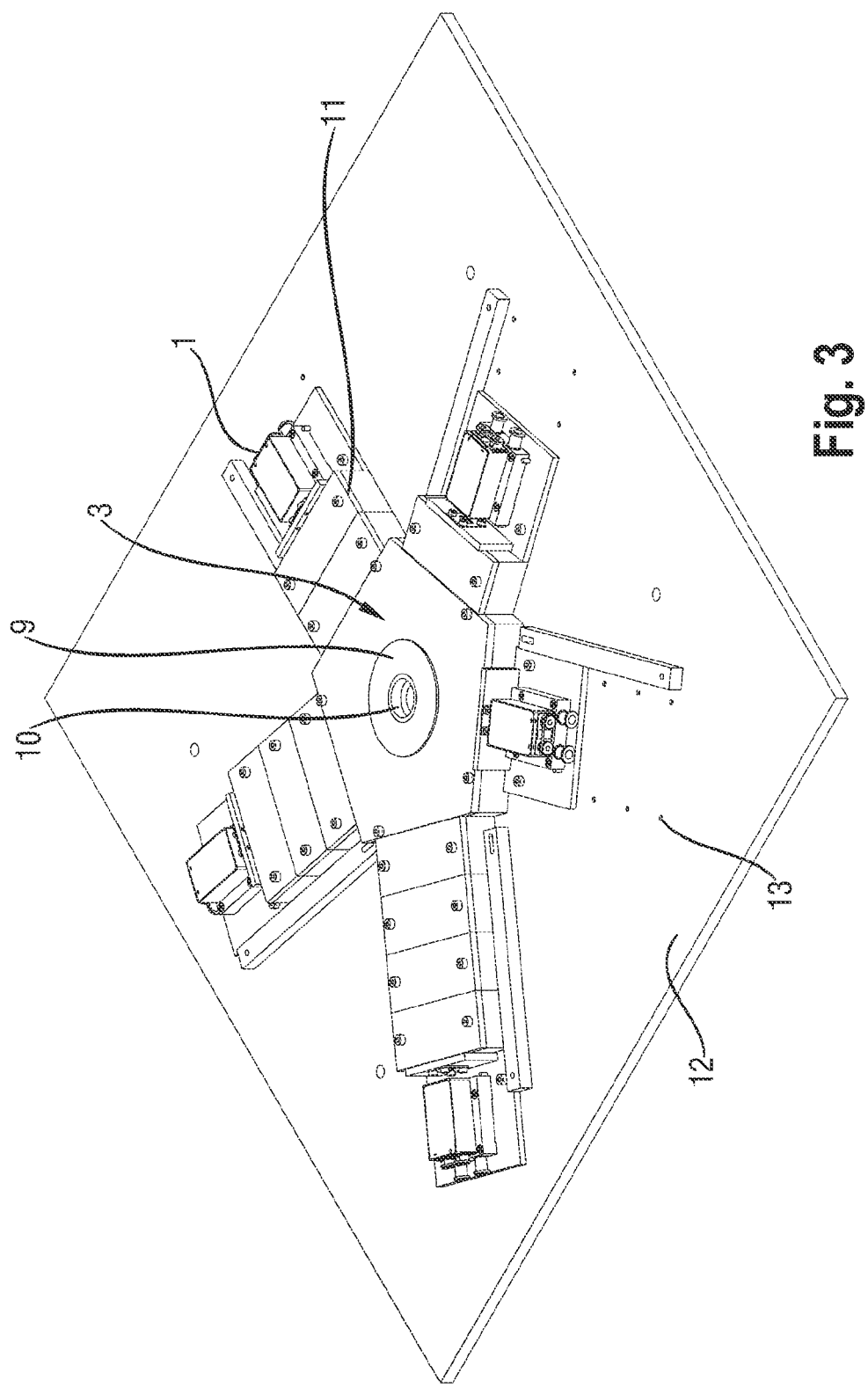
FIG. 3 shows a device that can be configured variably, according to another embodiment of the present invention.

As shown in FIG. 1, it is possible to increase the distance at which the laser-lens modules 1 are positioned with a gap relative to the waveguide 3. Such a gap between an exit window of a laser-lens module 1 and a beam inlet window of the waveguide 3 is then either covered by a cover cap 15 as shown in FIG. 1, or else joined by a number of lengthening modules 11 as shown in FIG. 3, which depicts a second embodiment.

The cover cap 15 and the lengthening modules 11 can be dimensioned in such a way that they fulfill the same function as the waveguide 3, i.e. in the direction of the slow axis, the space enclosed by the cover cap 15 is so large that the laser beam does not strike a side surface 16.

In contrast, in the direction of the fast axis, the height of the enclosed space is the same as the height of the cavity 7 of the waveguide 3, so that already here, a homogenization is initiated by multiple reflections.

FIG. 2 shows a sectional view through a device according to the first embodiment. It can be seen that a recess 4 around the cylinder axis 3.1 of the waveguide 3 only passes through the upper part 6. A workpiece that is placed into the recess 4 thus stands on the lower part 5, while the area of the circumferential surface that is being processed is adjacent to one end of the workpiece. In order to securely seal the cavity 7 vis-à-vis the laser beams, at least opposite from the beam inlet openings 8, the contact surfaces 17 via which the lower part 5 and the upper part 6 rest against each other are provided in a plane that is offset in the same direction with respect to the bottom surface 5.1 and the cover surface 6.1.

In the first embodiment, the recess 4 is a circular cylinder and thus suitable for a workpiece that is likewise configured cylindrically, at least in the area where it is to be processed with the laser beams so that it can be placed into the recess 4. Advantageously, there is only a small amount of play between the workpiece and the recess 4, which sharply delimits the area over the circumference of the workpiece that is being processed. Particularly if the processing is welding, this yields a neatly delimited weld seam.

A second embodiment, shown in FIG. 3, differs from the first one especially in terms of the base area of the waveguide 3, which represents an equilateral pentagon, optimized to the number of five laser-lens modules 1.

Advantageously, an adapter 9 is placed into the recess 4, which in this case is not dimensioned to hold the workpiece directly. This has the advantage that, through the use of a suitable adapter 9, the device can be adapted to various workpieces as a function of the circumferential size and the circumferential shape of the workpiece.

The device is ideal for processing workpieces that have circular cylindrical circumferential surfaces but it is also equally suitable for prismatic circumferential surfaces.

Advantageously, the free area in the adapter 9 can be delimited by a sleeve 10 that is transparent for the laser beams. In this manner, the cavity 7 of the waveguide 3 is prevented from becoming dirty due to waste products that are formed.

Merely to demonstrate the wide array of variations of a device according to the invention, a different number of lengthening modules 11 was arranged in front of the laser-lens modules 1 in FIG. 3. Fundamentally, the device is configured in such a way that the same number—which can also be zero—of lengthening modules 11 are placed in front of all of the laser-lens modules 1 in order to generate identical beam spots.

In order to be able to adapt a device to a different workpiece with as little adjustment effort as possible, a pattern of threaded holes 13 is provided in the baseplate 12, by means of which a varying number of lengthening modules 11 and the laser-lens modules 1 can be mounted at different predefined positions. In order to quickly position the lengthening modules 11, stop strips can be attached to the baseplate 12 against which the lengthening modules 11 can be laid.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS 1 laser-lens module
1.1 laser beam axis
2 circle
2.1 mid-point of the circle
3 waveguide
3.1 cylinder axis
4 recess
5 lower part
5.1 bottom surface
6 upper part
6.1 cover surface
7 cavity
8 beam inlet opening
9 adapter
10 sleeve
11 lengthening module
12 baseplate
13 threaded holes
15 cover cap
16 side surface
17 contact surface

What is claimed is:

1. A device for simultaneously processing a circumference of a workpiece with laser beams, the device comprising:
   a plurality of laser-lens modules, each including a diode laser having a fast axis and a slow axis and a beam-forming lens system disposed in front of the respective diode laser, the laser-lens modules being disposed at equal distances from each other on a circle, the laser-lens modules each being configured to emit a laser beam radially in a shared radiation plane with respect to a mid-point of the circle such that axes of the laser beams intersect in the midpoint; and
   a waveguide having a shape of a straight cylinder with a cylinder axis, the waveguide being disposed within the circle with the cylinder axis being perpendicular to the radiation plane and extending through the mid-point of the circle and a recess being formed around the cylinder axis, the recess being configured to hold a workpiece during the processing, the waveguide including a lower part and an upper part together forming a cavity enclosing the radiation plane, the cavity being open due to the recess, the cavity having a bottom surface configured to reflect the laser beams and a cover surface configured to reflect the laser beams, the cavity having a beam inlet opening toward each of the plurality of laser-lens modules along a circumference of the waveguide;
   wherein the laser-lens modules are each configured to emit the laser beam so as to be reflected repeatedly between the bottom surface and the cover surface of the waveguide in the direction of the fast axis, wherein the beam-forming lens system is configured in such a way that it widens the laser beam in the direction of the fast axis to such an extent that it already strikes the bottom surface and the cover surface shortly after entering the waveguide, and to propagate in an unaffected manner within the radiation plane in the direction of the slow axis so as to form a beam spot that strikes the workpiece with a homogenous energy distribution due to the repeated reflections in the direction of the fast axis, the beam spot having a height in a direction of the cylinder axis based on a distance between the bottom surface and the cover surface and a width based on a divergence angle of the laser beam in the radiation plane and a distance of the laser-lens module from a surface of the workpiece.

2. The device recited in claim 1, wherein a distance between the bottom surface and the cover surface decreases from the circumference of the waveguide toward the recess so as to improve a quality of the beam spot.

3. The device recited in claim 1, wherein the plurality of laser-lens modules is an odd number of laser-lens modules so as to avoid a reciprocal irradiation of the laser-lens modules.

4. The device recited in claim 1, wherein a base area of the waveguide is a polygon having a number of sides equal to a number of the plurality of laser-lens modules.

5. The device recited in claim 1, further comprising an infrared sensor disposed in the cavity configured to measure a temperature in the recess.

6. The device recited in claim 1, wherein an adapter is disposed in the recess, the adapter having a free inner area adapted to the circumference of the workpiece so as to provide adaptability of the device to workpieces of differing sizes and shapes.

7. The device recited in claim 6, wherein the recess extends through each of the upper part and lower part such that the workpiece is movable through the device in a direction of the cylinder axis.

8. The device recited in claim 6, wherein the adapter includes a sleeve that is transparent to the laser beams and is configured to delimit the free inner area so as to prevent the cavity from becoming dirty.

9. The device recited in claim 1, further comprising lengthening modules disposed between at least one of the laser-lens modules and a respective beam inlet opening, the lengthening modules being configured so as to lengthen the cavity in a direction of the respective laser beam axis, so as to provide adjustability of the beam spot width on the workpiece based on a size of the workpiece.

10. The device recited in claim 9, further comprising a baseplate, wherein the lengthening modules and laser-lens modules are each mounted on the baseplate.

11. The device recited in claim 10, wherein the baseplate includes threaded holes configured to selectively mount a variable number of lengthening modules on the baseplate so as to establish a differing distances of the laser-lens modules from the waveguide.

* * * * *